United States Patent
Maji et al.

(10) Patent No.: US 11,289,916 B2
(45) Date of Patent: Mar. 29, 2022

(54) LIGHTING SYSTEM AND METHOD

(71) Applicant: SIGNIFY HOLDING B.V., Eindhoven (NL)

(72) Inventors: Goutam Maji, Eindhoven (NL); Priya Ranjan Mishra, Eindhoven (NL); Srikanth Tunga, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/967,187

(22) PCT Filed: Jan. 28, 2019

(86) PCT No.: PCT/EP2019/051952
§ 371 (c)(1),
(2) Date: Aug. 4, 2020

(87) PCT Pub. No.: WO2019/154649
PCT Pub. Date: Aug. 15, 2019

(65) Prior Publication Data
US 2021/0050727 A1    Feb. 18, 2021

(30) Foreign Application Priority Data

Feb. 7, 2018   (IN) .............................. 201841004656
Mar. 30, 2018  (EP) ..................................... 18165327

(51) Int. Cl.
*H02J 3/38*   (2006.01)
*H05B 45/30*  (2020.01)
*H05B 45/37*  (2020.01)
*H05B 45/10*  (2020.01)

(52) U.S. Cl.
CPC .............. *H02J 3/385* (2013.01); *H02J 3/381* (2013.01); *H05B 45/10* (2020.01); *H02J 2300/26* (2020.01)

(58) Field of Classification Search
CPC .... H02J 3/38; H02J 3/381; H02J 3/383; H02J 3/385; H02J 2300/00; H02J 2300/26; H02J 7/35; H05B 45/10; H05B 45/37; H05B 45/30; H05B 45/3725
See application file for complete search history.

(56) References Cited

U.S. PATENT DOCUMENTS

| | | | |
|---|---|---|---|
| 9,470,413 B2 * | 10/2016 | Li | ............. H05B 45/10 |
| 2008/0169784 A1 * | 7/2008 | Chung | ...................... H02J 7/35 |
| | | | 320/101 |
| 2012/0212050 A1 | 8/2012 | Takehara | |
| 2013/0002141 A1 | 1/2013 | Lee | |

(Continued)

FOREIGN PATENT DOCUMENTS

| | | |
|---|---|---|
| EP | 2023037 A1 | 2/2009 |
| JP | 2013211248 A | 10/2013 |
| JP | 2011034896 A | 6/2015 |

*Primary Examiner* — Thai Pham
(74) *Attorney, Agent, or Firm* — Daniel J. Piotrowski

(57) ABSTRACT

A lighting system has a set of multiple LED luminaires, and combines solar panel power and external grid power. A solar converter converts the output from the solar panel into a first power. Each luminaire is associated with a driver to inject current into the LED lighting unit from the external grid power supply. The LED lighting units of the luminaires are connected together to the solar converter and are thereby driven together by the first power simultaneously. This simplifies the structure.

15 Claims, 4 Drawing Sheets

(56) References Cited

U.S. PATENT DOCUMENTS

2013/0002142 A1* 1/2013 Sawada ................. H05B 45/37
　　　　　　　　　　　　　　　　　　　　　　315/152
2016/0036240 A1　 2/2016 Mishra
2020/0278097 A1* 9/2020 Pahlevaninezhad .... F21S 9/035

* cited by examiner

LIGHTING SYSTEM AND METHOD

CROSS-REFERENCE TO PRIOR APPLICATIONS

This application is the U.S. National Phase application under 35 U.S.C. § 371 of International Application No. PCT/EP2019/051952, filed on Jan. 28, 2019, which claims the benefit of India Patent Application No. 201841004656, filed on Feb. 7, 2018 and European Patent Application No. 18165327.0, filed on Mar. 30, 2018. These applications are hereby incorporated by reference herein.

FIELD OF THE INVENTION

This invention relates to lighting systems and methods, and in particular which make use of solar energy.

BACKGROUND OF THE INVENTION

Power conversion systems are used to collect energy from a solar panel and to deliver the energy to a load or energy storage system. For lighting applications, the storage of energy enables the lighting to be powered during nighttime, using energy collected during the day. However, lighting may also be desired during the day, in particular for indoor lighting, and there are therefore also energy saving benefits in using solar power to power lighting even during daylight periods.

Power conversion takes place for the energy delivered by a solar system to provide the most efficient collection and storage of energy. Typically, this makes use of maximum power point tracking ("MPPT") systems, which control the operating point of the solar system (current and voltage) to achieve optimum power transfer.

The energy obtained from a solar system typically needs to be stored so that energy may be available from the system both during times when the solar cells are illuminated (during the daytime) and when they are not (during the nighttime). A conventional solar system for example makes use of a MPPT charge controller to charge a battery from the solar system. The charged battery can then be used to power electrical loads. This requires additional investment for the battery. Furthermore, the battery charging and discharging process typically causes 5-10% round trip efficiency loss.

Therefore, there is a need for a solution to enable direct solar power to be used for daytime lighting loads without using the battery. A grid tie inverter is able to directly feed the solar power to the AC grid, without using any battery. One approach which would enable solar energy to be used directly for LED based lighting would be to use a grid inverter and then perform AC-DC conversion. However, this results in a two stage (DC-AC and AC-DC) conversion process, which results in around 10-15% efficiency loss before reaching the LED load.

A grid feeding installation also requires a power purchase agreement (PPA) with utility company. Such a PPA is not beneficial for small amounts of power transaction so that the use of a grid inverter is not appropriate in many situations.

Therefore, a solution is needed to use direct solar energy for an LED lighting (or other DC load), without using any battery storage or grid tie inverter. The purpose is simply to make use of solar energy when it is available, rather than to collect and store the energy, so that efficiency gains may be made at low cost, for example without providing battery storage.

EP 2023037A1 discloses a luminaire that can utilize AC power as well as DC power directly from a solar panel. JP2013211248A discloses a system that can switch to either one of the solar energy and AC energy. US20130002142A1 and US20120212050A1 disclose similar hybrid power systems that first integrate both solar energy and AC energy and then convert the integrated energy to the load.

SUMMARY OF THE INVENTION

A drawback of the above prior art is that it only provides a single luminaire application. For indoor applications, there are usually a lot of luminaires. How to utilize the solar energy for a batch of the luminaires in a high efficiency way is desired. The invention is defined by the claims.

It is a concept of embodiments the invention to provide a lighting system which makes use of solar panel energy as well as an external grid power supply. A solar converter is used for the solar energy and a driver is used for the grid power supply. There are multiple luminaires, and their lighting units are connected together to be driven as one unit by the solar converter. Thus, a limited number of solar converters is enough for the batch of the luminaires. This reduces hardware cost and simplifies the overall system.

According to examples in accordance with an aspect of the invention, there is provided a lighting system comprising:

a grid input for connection to an external grid power supply;

an LED luminaire system comprising a set of multiple luminaires, each luminaire comprising an LED lighting unit and a driver connected to the grid input to inject current into the LED lighting unit from the grid power supply;

a solar input for connection to a solar panel;

a solar converter connected to the solar input to convert the output from the solar panel into a first power; and a connection unit to connect the LED lighting units of the set of the multiple luminaires together and to the solar converter and thereby drive the LED lighting units of the set of multiple luminaires is adapted to share the first power, wherein from the perspective of one LED lighting unit of one luminaire, the driver of that one luminaire and the solar converter are in parallel connection with the LED lighting unit and the solar converter and the driver are adapted to drive the LED lighting units simultaneously.

This lighting system makes use of multiple luminaires. They are associated with conventional drivers which provides power conversion from an external AC or DC grid power supply (e.g. AC mains). The luminaires may each have their own driver or the driver may be shared between them. Most importantly, the lighting units of the luminaires are connected together by an extra connection unit, for example in series, and they are controlled/driven by a shared solar converter which provides power conversion from the solar panel. This unit avoids the need for battery storage when the solar energy is received at the same time that it is desired for the LED lighting. This provides a more efficient use of energy. The connection of the LED lighting units together for control as a single unit from the point of view of the solar panel provides reduced hardware cost. For example, it enables sharing of driver components such as an MPPT driver or an MPPT controller of an MPPT driver.

The solar converter (from the solar panel) and the driver (the grid driver) are effectively connected in parallel from the point of view of each LED lighting unit, in that power can be received from one or other or both power sources. The solar panel solar converter for example delivers as much energy as it produces and the remaining requirement is met by the associated driver. This parallel connection allows controlling the power to the LED lighting unit more conveniently.

The power rate of the driver is at least 10% of the peak output power rate of the solar panel, for example at least 20% and more preferably at least 30%. Thus, when the solar panel delivers a dropped power output due to the insolation on the solar panel, the driver can compensate for the power reduction.

The grid driver may however have a lower peak power delivery than the peak solar panel output power rate, for example below 50%. The aim is to provide grid energy savings while maintaining light output stability.

The solar converter is decoupled from the solar input or the solar converter at the input of the driver, and each associated driver comprises a feedback control system which controls the associated driver in dependence on the current flowing to the LED lighting unit from both the first power and from the associated driver itself.

The feedback control implemented by the driver is thus used to regulate the total current flowing, e.g. from both the solar panel and from the external grid. This provides a feedback loop to maintain the current thus flickering is prevented/reduced.

The solar converter is preferably adapted to vary the first power in order to track a maximum output power from the solar panel given different solar radiation conditions, the driver is adapted to provide variable instantaneous power corresponding to the variable instantaneous power from the solar converter such that the sum power to the LED lighting unit is constant at a given dimming level of the luminaire, and the driver is adapted with a response capability to increase its output, within at most one second, to counteract at most 60% percent drop in the power of the solar panel within the same one second.

Thus, the driver is controlled to maintain a desired power transfer to the luminaires, and can also respond quickly to changes in solar panel output.

The solar converter may be adapted to reduce power to the set of multiple luminaires, according to a dimming down command for at least one luminaire in the set of luminaires, wherein in response to the dimming down command:
the driver associated with the at least one luminaire is adapted to reduce the power from the grid power supply; and the driver associated with other luminaires in the set is adapted to increase the power from the grid power supply so as to maintain the power to the other luminaires.

In order to dim down one luminaire, less current is provided to the lighting units of that luminaire. Due to the connection of all lighting units, less current is also provided to the lighting units of other luminaires. Therefore, excess grid power is provided to other luminaires to maintain the output of other luminaires since they are not to be dimmed down.

There may be a plurality of sets of multiple luminaires. There may then be sharing of some hardware of the solar converter even between multiple sets of luminaires. Each set of luminaires may be considered to comprise a cluster.

When the lighting system comprises a plurality of sets of multiple luminaires (i.e. multiple clusters as mentioned above) the solar converter may then comprise a single MPPT controller and a respective DC-DC converter within each set of multiple luminaires. The plurality of DC-DC converters share the output power of the solar panel and achieve an overall maximum output power controlled by the single MPPT controller.

In case of dimming down at least one luminaire in one set of luminaires, the DC-DC converter associated with other sets, different from the set to which the dimming down command relates, may then be adapted to increase power from the solar panel in order to maintain the maximum power output from the solar panel.

In this way, a reduction in solar power drawn by one set of luminaires, in response to a dimming down command, is compensated by increasing the demand from other sets of luminaires, so that maximum power point tracking can be maintained. Further, in order to compensate increased solar power to other sets, the driver associated with the other sets is for example then adapted to reduce the power from the grid power supply (because the solar contribution has increased) so as to maintain the power to the luminaires of the other sets.

The solar converter may thus use a shared MPPT controller, and this may apply when there is one set of luminaires or when there are multiple sets of luminaires.

The connection unit is preferably adapted to connect at least some of the LED lighting units of different luminaires in series to the solar converter. In this regard, each set i.e. cluster of luminaires may be defined as a group which has their lighting units connected in series to the respective DC-DC converter which forms part of the solar converter. The solar converter then delivers current to the series chain of luminaires. Driving a series connection of LED units is relatively easy by implementing the DC-DC converter in a current source manner, thus this implementation is more convenient.

Alternatively, the connection unit/line may connect the LED units of the different luminaires in parallel to the solar converter. In this case a current distribution circuit may be used to regulate the current to the LED units of each luminaire. The solar converter may be implemented by a voltage source and multiple linear switches to regulate the currents. An advantage of this embodiment is that it is robust in case that the lighting unit of one luminaire becomes open circuit, and other lighting units can still be driven by the solar converter.

The drivers are preferably connected in parallel to the external grid power supply Thus, there is a parallel connection between the grid drivers, but a series connection to a shared solar converter as mentioned above. The solar converter is typically adapted to provide a current as the first power.

The lighting system may comprise a respective driver for each luminaire within the set or multiple sets of luminaires. Each luminaire has its own driver in this example. Instead, there may be a shared driver for each set of multiple luminaires. This implementation can meet the current trend of DC grid and centralized drivers for lighting applications.

In either case, there is for example an AC-DC PFC stage, wherein each set of luminaires comprises a DC-DC stage for receiving power from the AC-DC PFC stage. In this case, the AC-DC PFC stage and one DC-DC stage together function as the associated driver.

In this example there is a shared power factor correction power converter for the drivers of the luminaires of the set or indeed for the drivers of the luminaires of the multiple sets.

Each LED lighting unit for example comprises an array of LED chips.

The invention also provides a driver unit for a luminaire which comprises an LED lighting unit, the driver unit comprising:

a grid input for connection to an external grid power supply; and a driver connected to the grid input to inject current at a driver output into the LED lighting unit of the luminaire from the grid power supply, a solar input for connecting the LED lighting unit either to an LED lighting unit of a connected preceding luminaire or to a first power which is derived from a solar panel;

wherein the solar input and first output define an interface to another luminaire such that the LED lighting unit is connected to the LED lighting unit of the other luminaire and share the first power from a solar converter different from the driver, wherein the solar input and the first output are in parallel connection with the driver output to the LED lighting unit, the driver is adapted to drive the LED lighting units simultaneously as the first power.

This driver unit may be used in a luminaire to implement the system described above, for example with a hybrid series connection to solar power and parallel connection to grid power. The LED lighting unit is connected to the LED lighting unit of a preceding and/or following luminaire so that a set of connected lighting units may be formed. At the ends of the set, a connection can be made (using the same interface) to the first power received from the solar converter. Thus, the driver unit design enables a set of such driver units to be connected with their LED lighting units in series and with that series connection supplied by a solar converter.

The invention also provides a luminaire comprising:
an LED lighting unit; and
a driver unit as defined above.

This provides the combination of a driver as defined above with an LED lighting unit.

The invention also provides a driving method for an LED luminaire system comprising a set of multiple luminaires, the method comprising:

receiving energy from an external grid power supply;

using a driver associated with each luminaire to inject current into an LED lighting unit of the luminaire from the external grid power supply;

receiving energy from a solar panel;

converting the energy from the solar panel into a first power;

connecting the LED lighting units of the luminaires together to the first power such that the LED lighting units of the set of multiple luminaires shares the first power, wherein connecting the driver and the first power in a parallel connection with the LED lighting unit from the perspective of the LED lighting unit, and the driver injecting the current simultaneously as the first power powering the LED lighting unit.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
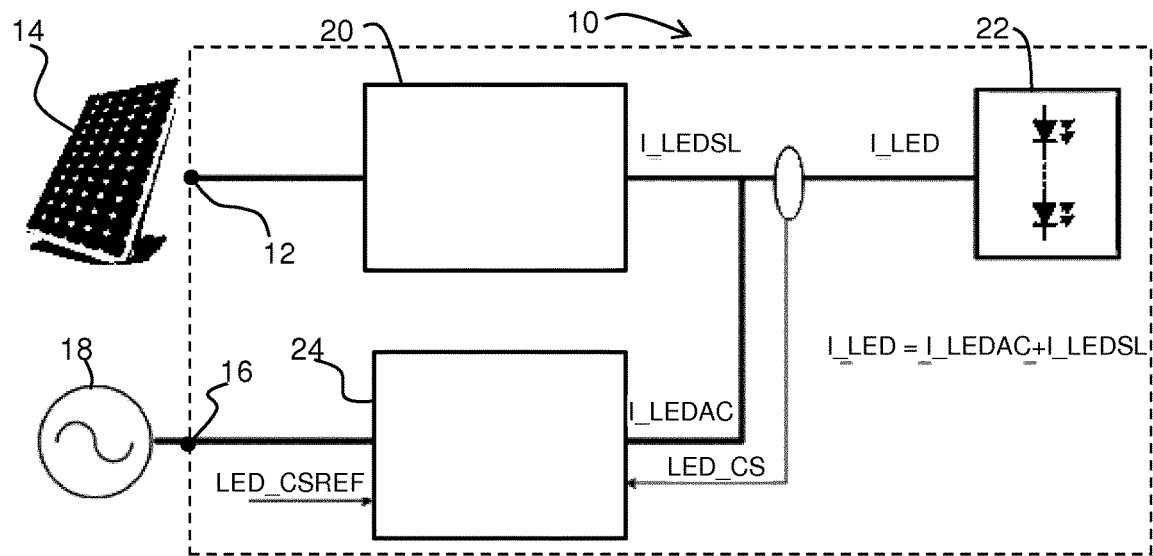
FIG. 1 shows in simplified schematic form a block diagram of a battery-less, power and control scheme for direct LED driving from harvested solar power.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting system with a set of multiple LED luminaires, and which combines solar panel power and external grid power. A solar converter converts the output from the solar panel into a first power. Each luminaire is associated with a driver (which could be a respective driver or a shared driver) to inject current into the LED lighting unit from the external grid power supply. The LED lighting units of the luminaires are connected together to the solar converter and are thereby driven together by the first power simultaneously. This simplifies the structure of driving the multiple luminaires from solar power.

FIG. 1 shows in simplified schematic form a block diagram of a battery-less, power and control scheme for direct LED driving from harvested solar power.

The lighting system 10 comprises a solar input 12 for connection to a solar panel 14 and a grid input 16 for connection to an external grid power supply 18, such as an AC mains supply.

A solar converter 20 is connected to the solar input 12 to convert the output from the solar panel 14 into a first power, shown in this example as output current I_LEDSL.

An LED luminaire system 22 is provided which comprises a set of multiple luminaires (not individually shown in FIG. 1), each comprising an LED lighting unit (which typically comprises a series LED arrangement). Each LED luminaire is associated with a driver 24 connected to the grid input 16 to inject current into the LED lighting unit from the grid power supply. This injected current is shown as I_LEDAC.

Each luminaire is described as "associated with" a driver, because there may be a driver within each luminaire, or there may be a shared driver architecture as shown in the simplified schematic of FIG. 1, or there may be a partially shared driver architecture. These different possibilities are discussed further below.

The solar converter 20 and the driver 24 are effectively connected in parallel from the point of view of the luminaire system, in that power can be received from one or other or both power sources.

Within the luminaire system 22, there is a connection unit to directly connect the LED lighting units of the multiple luminaires together to the solar converter 20 so that the LED lighting units of the set of multiple luminaires are driven together by the first power simultaneously.

There is a feedback system for controlling the driving of the luminaire system or indeed individual luminaires within the luminaire system. FIG. 1 shows a current sensing (CS)

feedback signal LED_CS which is used as part of the control of the driver. Thus, the active control is implemented by the driver in response to an input reference drive level LED_CS-REF. The solar panel converter 20 for example is used to deliver as much energy as it produces and the remaining requirement is met in a dynamic controlled way by the associated driver 24.

The luminaire system 22 makes use of multiple luminaires. A shared solar converter 20 provides power conversion from a solar panel. This avoids the need for battery storage when the solar energy is received at the same time that it is desired for the LED lighting. This provides a more efficient use of energy. The connection of the LED lighting units together for control as a single unit from the point of view of the solar panel provides reduced hardware cost. For example, it enables sharing of driver components such as an MPPT driver or an MPPT controller of an MPPT driver.

The individual units used to form the overall system may be conventional. For example, the system may make use of a known MPPT (maximum power point tracking) based LED driver module (which is termed a "converter" in this application) for the solar panel and a conventional grid powered LED driver module. The MPPT based converter 20 will try to maintain a current through LED by extracting maximum power from the solar system. The solar insolation will vary with time causing changes in output power, hence causing changes in output current. Continuous changes in LED current are of course not accepted so the conventional LED grid driver 24 functions as an LED current balancer and controller to smoothen the LED current.

In this way, the total LED current will be formed by the summation of the current supplied by MPPT converter 20 and the grid-based LED driver 24.

A typical LED driver 24 already includes a current controller, and the system enables integration of the solar panel while still using the same LED driver 24 and making use of current control implemented by the LED driver 24.

FIG. 1 represents a single luminaire as a single block 22 driven by the solar converter 20.

The invention proposes driving multiple luminaires, which together from a luminaire system, by a single solar converter/solar panel. For this purpose, an interconnection scheme between multiple luminaires is provided.

Figure 2:
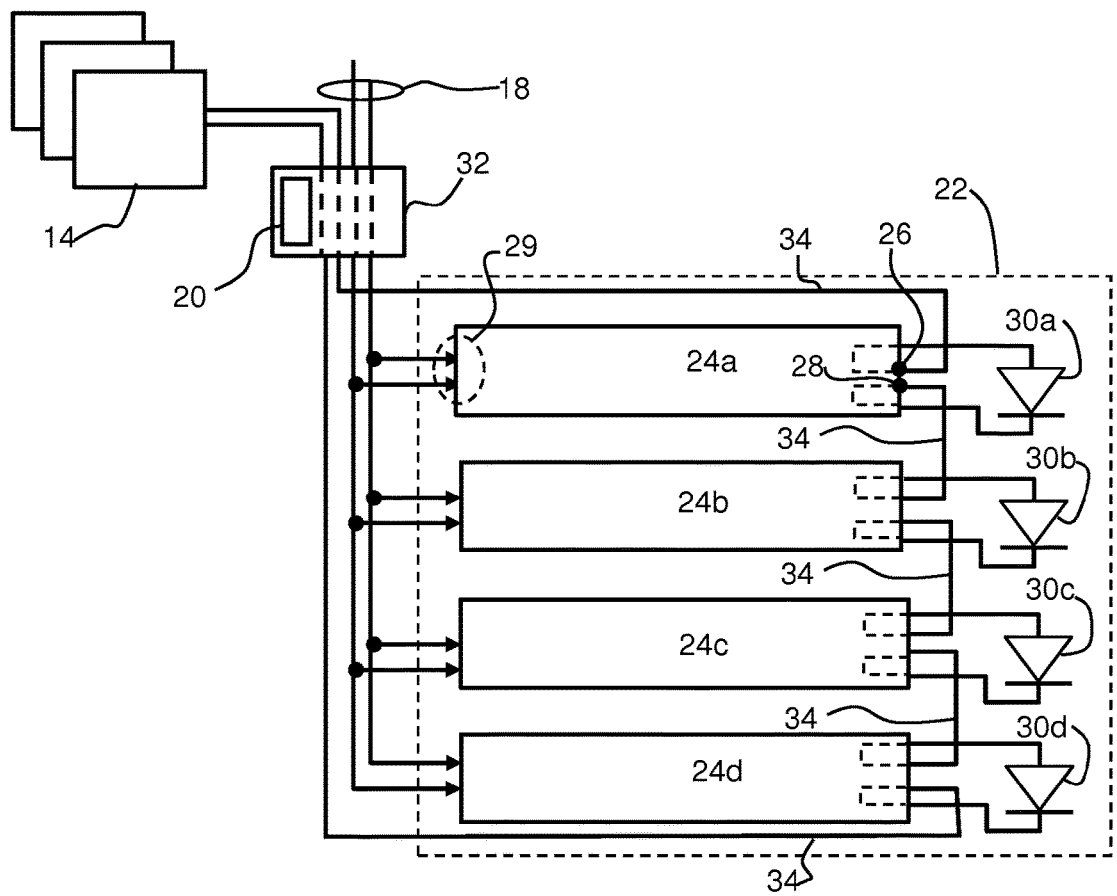
FIG. 2 shows in schematic form one possible interconnection scheme between multiple luminaires which together form the luminaire system.

FIG. 2 shows in schematic form one possible interconnection scheme between multiple luminaires which together form a luminaire system 22. Each luminaire comprises a respective driver unit 24a, 24b, 24c, 24d and an associated lighting unit 30a, 30b, 30c, 30d. Thus, in this example, each luminaire has its own conventional grid driver unit 24a-24d. Together, these grid driver units 24a-24d form the overall driver 24 for the set of luminaires.

FIG. 2 shows for the first driver unit 24a a solar input 26 for connecting the LED lighting unit 30a either to an LED lighting unit of a connected preceding luminaire or to a first power which is derived from a solar panel. For the first driver unit 24a, this solar input 26 connects to the converter 20, whereas for other driver units 24b-24d, this solar input connects to the preceding luminaire.

A first output 28 is for connecting the LED lighting unit either to an LED lighting unit of a connected following luminaire or to the first power. For the first driver unit 24a, this first output 28 connects to the next luminaire, whereas for the last driver unit 24d in the series, this first output 28 connects back to the converter.

Within each driver, the solar input 26 is also connected to the anode of the LED lighting unit, and the first output 28 is also connected to the cathode of the LED lighting unit. This is represented by the dotted connection lines in FIG. 2. Thus, the lighting units 30a-30d are connected in series to the converter 20. A grid input 29 is provided for connection of a driver within each driver unit to the external grid power supply 18.

In this way, the solar input 26 and first output 28 define an interface to another luminaire such that the LED lighting unit 30a-30d is directly connected to the LED lighting unit of the other luminaire, and that interface is also for receiving the first power from the solar converter 20. Note that the wiring could also connect directly to the anode and cathode of the LED lighting unit, in case the driver units 24a to 24d do not provide the separate solar input and first output.

FIG. 2 shows the converter 20 forming part of a distribution unit 32 between the grid 18 and the solar panel 14 on one side and the luminaire system 22 on the other side. This distribution unit includes the single converter 20 which is shared between all luminaires.

The grid (AC) power is provided to all individual driver units 24a-24d in conventional parallel way through the distribution unit. However, solar power is provided to the luminaires as a series bank of lighting units. The series connection is made by a connection unit 34, in particular a set of electrical connections between the lighting units of the luminaires.

By way of example, if each lighting unit voltage is 40V DC and four such units are connected in series, the MPPT converter output will be 160V DC. The output current sense resistor of each driver unit 24a, 24b, 24c, 24d will sense the total current flowing to the LED unit of that driver unit, namely including the contributions both from the solar converter 20 as well as from the grid. The driver has a sense resistor that is placed between the solar input and the first output and in series with the LED units.

In this approach, the rated lighting unit current will be slightly higher than the maximum MPPT output current from the driver 20 at the highest solar insolation, to provide a best utilization of solar power. By way of example, it has been found by experiment that around 80% of solar current and 20% of grid current to the lighting units provides a desired operating point in order to achieve grid energy savings but also light output stability. However, for better power factor correction (PFC) and total harmonic distortion (THD) performance it is advisable to limit the solar power to a maximum of 70% of the total lighting unit power, which is equivalent to 30% dimming for the AC-DC LED driver units 24a, 24b, 24c, 24d.

To enable the lighting units to be connected together as explained, each luminaire of the set is equipped with two extra wires.

A boost type MPPT LED converter 20 is for example used to boost the voltage from the solar panel (for example 30V to 37V) to 160V to power the series-connected LED strings. The boost MPPT LED converter 20 tracks the solar voltage and current and extracts the maximum power from the solar panel and feeds this power to the LED strings.

The control loop of the grid LED driver units 24a to 24d has a response time which is fast enough to handle changes in solar insolation without producing any deviations in visible light output from the set level. Therefore, it can provide a stable light output by adjusting its own current contribution to the LEDs. According to statistics, the solar panel output may drop by 60% in one second due to insolation change (such as when the sun is blocked by a cloud). By way of example, the driver units are adapted with a response capability to increase their output, within at most one second, to counteract at most 60% percent drop in the power of the solar panel within the same one second.

In general, the power rate of the (grid) driver is at least 10% of the peak output power rate of the solar panel. The MPPT converter varies the first power from the solar panel in order provide maximum power point tracking from the solar panel given different solar radiation conditions. The driver units then provide variable instantaneous power corresponding to the variable instantaneous power from the converter such that the sum power to the LED lighting unit is constant at a given dimming level of the luminaire.

To reduce the wiring cost and complexity, a number of solar panels may be connected in series or parallel according to the requirements for power level, current and voltage, so that only two wires are needed from the solar panel (or solar panel array).

FIG. 2 shows one set of multiple luminaires. There may be a plurality of sets of multiple luminaires, and each set may then be considered to be a luminaire cluster within the overall set of luminaires of the luminaire system. Each set has the lighting units combined and controlled by a single MPPT converter 20 as explained above.

Figure 3:
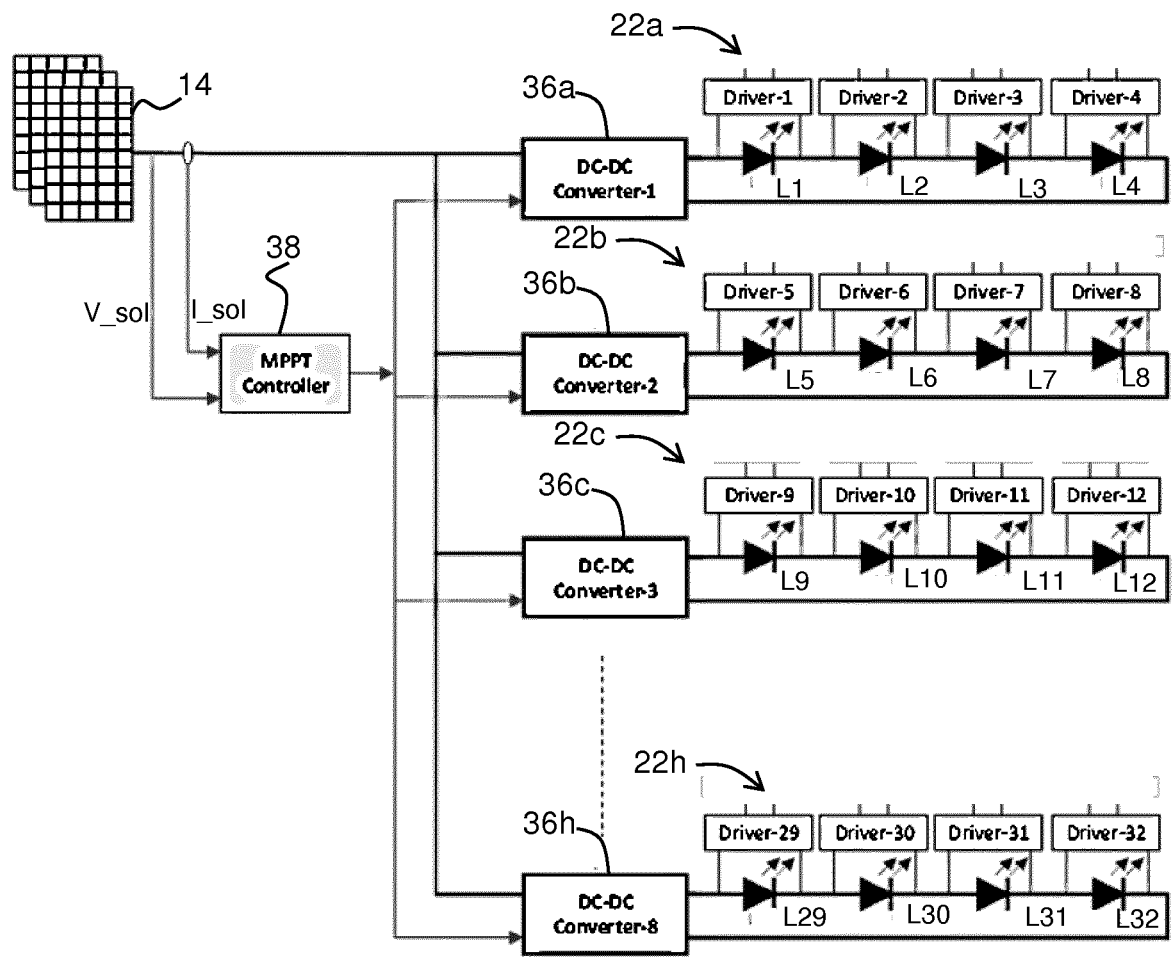
FIG. 3 shows a first example of a system with eight sets of multiple luminaires.

FIG. 3 shows a first example showing eight sets 22a to 22h of multiple luminaires (22d to 22g are not shown). Each set is shown with four luminaires (L # where # is a luminaire number), and each luminaire has its own grid driver unit (i.e. the driver units 24a-24d which together define the driver 24). There are thus 32 grid driver units (4×8) shown as "Driver-1" to "Driver-32". They are each part of a corresponding luminaire L1 to L32. Each driver unit is connected to the grid supply.

The lighting units of luminaires in each set are connected in series as shown. FIG. 3 represents each luminaire lighting unit as a single LED, but there will be a series and/or parallel connection of LEDs within each luminaire. In the example shown, each set 22a-22h has an associated DC-DC converter 36a to 36h (36d to 36g are not shown). There is one shared MPPT controller 38 which drives all of the DC-DC converters.

The DC-DC converters function as power conditioning units which give good controllability. The lighting units of the luminaires in each set are connected in series and connected with one DC-DC converter for easy installation (wiring). Typically, the DC-DC converter supplies four to six luminaires.

The DC-DC converters operate as parallel-connected MPPT converters but sharing the MPPT controller. The MPPT controller 38 senses the solar voltage V_sol and current I_sol and generates a pulse width modulation signal which is common to all of the DC-DC converters 36a to 36h, with the goal of maximizing the output power of the solar panel namely V_sol*I_sol. A known method of perturb and observe can be used. Because the same PWM signal is provided, all of the DC-DC converters are intended to operate at the same power level. However, due to differences in LED forward voltage between luminaires and different sets of luminaires, the DC-DC converters will not be able to operate at same power level in practice.

To prevent any luminaire from being operated at power levels greater than the rated power level of luminaire, each DC-DC converter operates at a limited power mode, whereby at any condition, no DC-DC converter operates its associated luminaires beyond the rated power of the luminaires.

A power limited mode boost converter can be implemented using commercially available peak current control MOSFET driver ICs.

An alternative option is to provide different PWM signals to each of the individual DC-DC converters especially when the DC-DC converters have different rating. This option can be useful to match the current flowing through different parallel sets of luminaires.

In order to achieve maximum power point operation of the solar panel, and with constant PWM control of all of the DC-DC converters, the (single) PWM duty cycle is modulated until the maximum power point has been achieved. However, at times of high solar radiation, some DC-DC converters will then operate at the limited peak power whereas other converters will operate below this limited peak power to achieve the goal of the overall system operating at the maximum power point. For example, a total generated solar power may be 880 W for 8 DC-DC converters and 32 luminaires (as shown in FIG. 3). When each DC-DC converter is controlled with the same PWM signal, the generated solar power is intended to be divided equally between the 8 DC-DC converters so that each DC-DC converter should receive 110 W of power. Due to differences in the LED string voltages, converters 36a, 36b, 36c may be connected to LED strings with a lower forward voltage than the rest. If each luminaire has a rated power of 40 W and a maximum 70% of this is to be provided from the solar source, a maximum power limit is set to 112 W (0.7*160 W) per DC-DC converter. Due to a comparatively low LED string forward voltage, converters 36a to 36c may instead operate at a power of 112 W at which the power is limited. The other converters 36d to 36h may then be operated at a power below the 112 W limit, for example to maintain the same overall power. For example, 880 W-112 W*3=544 W is then shared between the five remaining converters, which thus may operate at 108.8 W.

In this way each DC-DC converter will limit its own power so that the system as a whole will still operate at the maximum power point of the solar panel.

It may be desirable to be able to dim an individual luminaire, or a sub-set of luminaires within a set, or all of the luminaires of one set, compared to the rest (when there are multiple sets). It is however still desirable to be able to operate the solar panel at the maximum power point.

Assuming for example that 40 W luminaires are being powered with 20 W from the grid and 20 W from the solar power. In combination, four luminaires in a set will operate at 80 W of power from the solar panel and 80 W of power from the grid. For a daylight harvesting operation, one particular luminaire may want to dim down to 50% i.e. 20 W of power. For example Luminaire L1 associated with Driver-1 may want to dim down to 20 W.

To achieve this aim while maintaining maximum power point operation of the solar panel, the DC-DC converter 36a will operate to supply 40 W output power instead of 80 W. All four luminaires of the set 22a will be supplied with 10 W of average power from solar, i.e. based on the same PWM duty cycle control.

In that case luminaire L1 will receive 10 W from the AC grid whereas the other three luminaires L2, L3, L4 (in non-dimming mode) will each receive 30 W from the AC grid, based on the feedback control implemented within each individual driver.

Thus, the solar panel delivers 10 W to each luminaire in the set through the converter 36a, and the grid driver delivers the rest.

There is a reduction of 40 W of power supply from the converter 36a. This additional 40 W is distributed among the other converters (36b to 36h) in such a way that all converters will operate at a power level above the previous 80

W but below the solar power limit, given as 112 W above. Therefore, luminaires L5 to L32 will thus receive a slightly increased solar power share (>50%) than AC power share (<50%). In this way partial dimming of one or more luminaires with the overall system can be achieved while maintaining system-level maximum power point tracking operation. Those DC-DC converters (36b to 36h) will be instructed with a new PWM duty cycle (a larger duty cycle, for example) so as to increase the power drawn from the solar panel.

Thus, by this approach, if one converter is adapted to reduce power to its associated set of luminaires according to a dimming down command for at least one luminaire in the set of luminaires, the driver associated with the at least one luminaire is also adapted to reduce the power from the grid power supply. The driver or drivers associated with other luminaires in the set are adapted to increase the power from the grid power supply so as to maintain the power to the other luminaires.

The DC-DC converter associated with other sets of luminaires is then adapted to increase power from the solar panel in order to maintain the maximum power output from the solar panel. Thus, a reduction in solar power demand to one set of luminaires is compensated by an increased demand from the others, so as to maintain the maximum power point tracking.

If all luminaires in a set are desired to be dimmed down, the solar MPPT controller 38 may need to operate below the maximum power point or else the system may seek permission from a building management system to provide further dimming down even though the system had already reached a maximum power saving mode.

For example, for a particular desired ambience (scene setting) or during a meeting room presentation, a user may want to dim down the light source to focus on an object such as a presentation screen etc. In this kind of application, the user may intend to reduce the light output even though a maximum power saving mode is reached.

In some arrangements, extra solar power than is needed for the lighting may be utilized for some other purpose.

Similarly, in case of luminaires with integrated presence detection sensors which are required to turn off when there is no presence detection, during these situations the respective DC-DC converter can be switched to zero power mode so that power can be diverted to other DC-DC converters to meet the maximum power point operation.

In another example, when the solar panel has excess generated power than is required by the lighting units, the DC-DC converters can operate at constant power mode which will be at a slightly lower operating point than the maximum power point of operation. In this case, power to the lighting units will be completely supplied by the solar panel. The AC grid can be eliminated completely to prevent the driver operating at a low power factor or low total harmonic distortion. The AC power will only kick in when the generated solar power is less than the demand.

The MPPT converter may be equipped with a communications module to communicate with the building management system. In this way, the dimming function can also be controlled through the MPPT converter along with the grid driver.

The lighting units are described above as connected in series to the converter 20 but they may be connected in parallel or series based on the installation requirements and maximum voltage and maximum current of operation.

Figure 4:
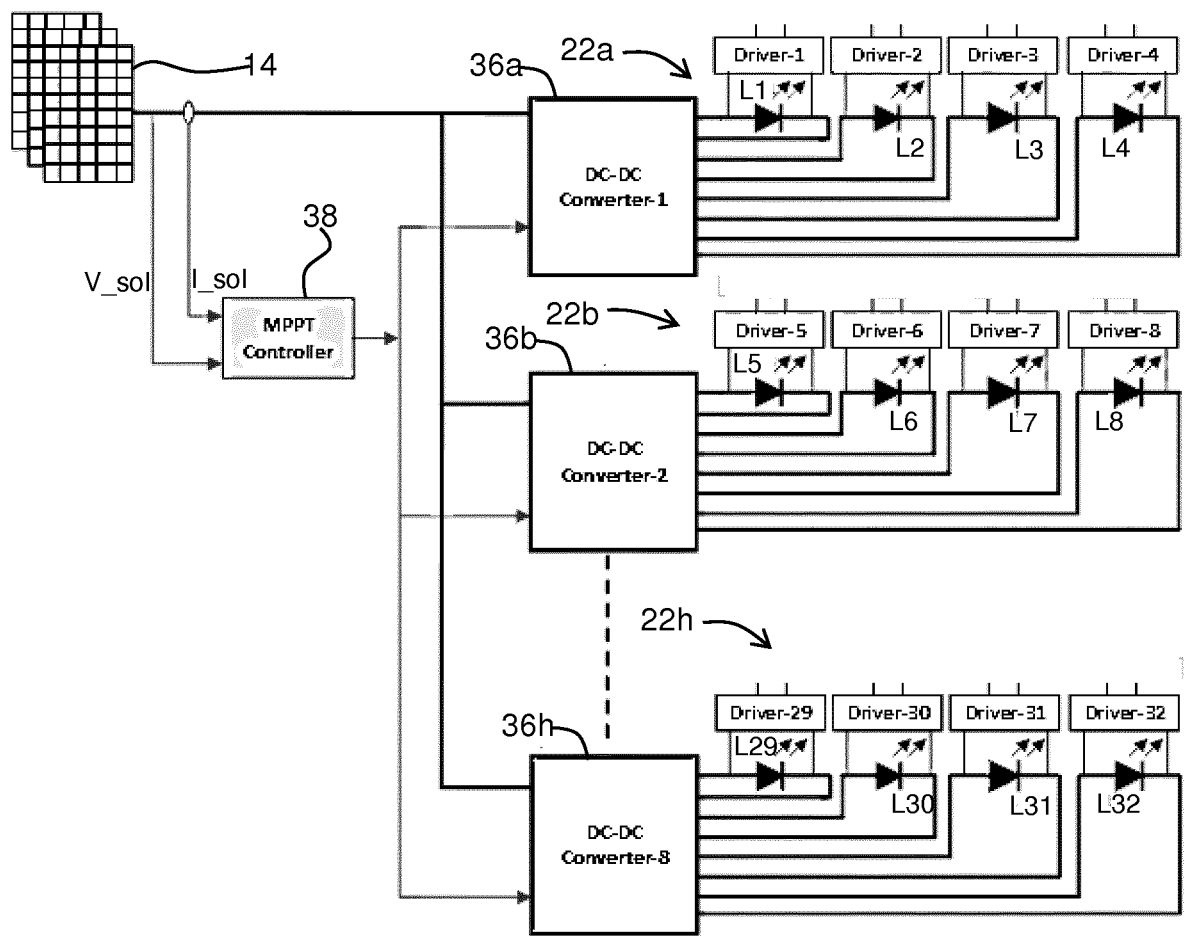
FIG. 4 shows a second example of a system with eight sets of multiple luminaires.

FIG. 4 shows an arrangement with the luminaires L1 to L32 in parallel. Each again has an associated driver Driver-1 to Driver-32, but there are also separate outputs to each luminaire from the associated DC-DC converter 36a to 36h. In short, within in one set, the DC-DC converter drives the LED lighting unit of one luminaire independently from the driving of another luminaire. The failure/open circuit of one LED lighting unit does not influence the others. More specifically, the DC-DC converter may be implemented by a voltage source and multiple linear switches to regulate the currents to different luminaires. This is useful when the LED lighting units have similar forward voltage.

Figure 5:
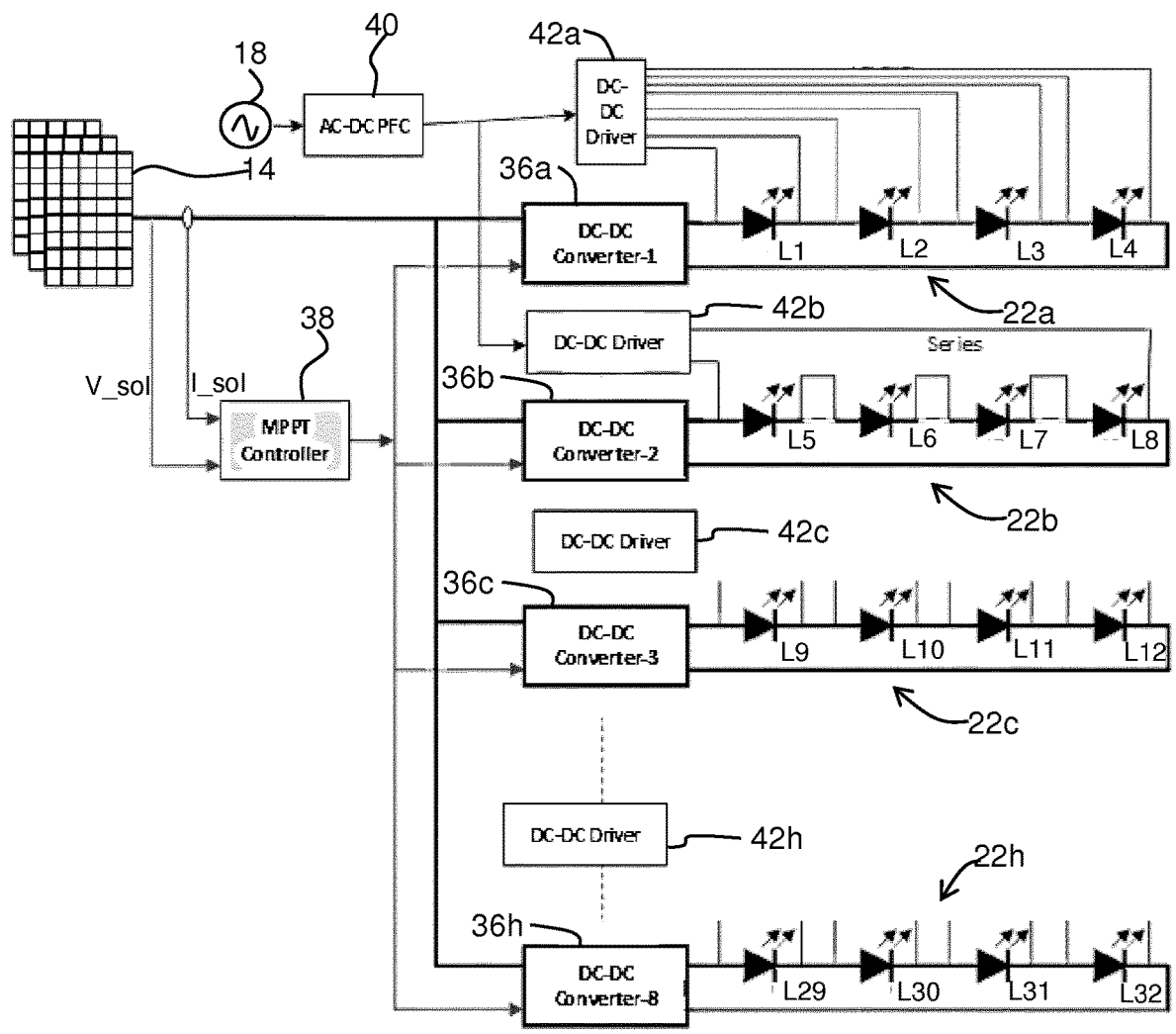
FIG. 5 shows a third example of a system with eight sets of multiple luminaires.

FIG. 5 shows that different sets of luminaires may have different configurations. Each set in this example has the lighting units again connected in series to the associated DC-DC converter.

The grid driver 24 comprises a shared AC-DC converter 40 with power factor correction and one of a set of DC-DC drivers 42a to 42h associated with each set of luminaires.

The first DC-DC driver 42a connects to each luminaire L1 to L4 in parallel and has a respective output for each luminaire. The second DC-DC driver 42b connects to the set of series luminaires with only one output for the full set and connects all LED lighting units of the luminaires in series, similar to the DC-DC converter for the solar panel. Thus different combinations of circuit configurations are possible. The DC-DC driver 42a may be implemented by a voltage source and multiple linear switches to regulate the currents to different luminaires. This is useful when the LED lighting units have similar forward voltage. The DC-DC driver 42b may be implemented by a current source and is easy and convenient to implement and the wiring is simple.

During load shedding or during changeover of the supply (i.e. from the grid supply to the DC supply), the lighting system may be powered by solar energy to avoid periods of darkness.

The invention is of particular interest for indoor lighting systems especially in offices and commercial buildings.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system comprising:
a grid input for connecting to an external grid power supply;
an LED luminaire system comprising a set of multiple luminaires (L1-L32), each luminaire comprising an LED lighting unit and a driver connected to the grid input to inject current into the LED lighting unit from the grid power supply; and
a solar input for connecting to a solar panel;
a solar converter connected to the solar input to convert the output from the solar panel into a first power;
a connection unit for directly connecting to a plurality of LED lighting units of the set of the multiple luminaires together and to the solar converter and thereby the LED lighting units of the set of multiple luminaires is adapted to share the first power, wherein the driver of one luminaire and the solar converter are in parallel connection with one LED lighting unit and the one solar converter and the driver are adapted to drive the LED lighting units simultaneously.

2. The lighting system as claimed in claim 1, wherein each associated driver is decoupled from the solar input or the solar converter at the input of the driver, and comprises a feedback control system which controls the associated driver in dependence on the current flowing to the LED lighting unit from both the first power and from the associated driver itself.

3. The lighting system as claimed in claim 1, comprising a plurality of sets of multiple luminaires.

4. The lighting system as claimed in claim 2, wherein:
the solar converter is adapted to vary the first power in order to track a maximum output power from the solar panel given different solar radiation conditions;
the driver is adapted to provide variable instantaneous power corresponding to the variable instantaneous power from the solar converter such that the sum power to the LED lighting unit is constant at a given dimming level of the luminaire; and
the driver is adapted with a response capability to increase its output, within at most one second, to counteract at least 60% percent drop in the power of the solar panel within the same one second.

5. The lighting system as claimed in claim 4, wherein:
the solar converter is adapted to reduce power to the set of luminaires, according to a dimming down command for at least one luminaire in the set of luminaires, wherein in response to the dimming down command:
the driver associated with the at least one luminaire is adapted to reduce the power from the grid power supply; and
the driver associated with other luminaries in the set is adapted to increase the power from the grid power supply so as to maintain the power to the other luminaires.

6. The lighting system as claimed in claim 5, comprising a plurality of sets of multiple luminaires, wherein the solar converter comprises a single maximum power point track (MPPT) controller and a respective DC-DC converter within each set of multiple luminaires, wherein the DC-DC converter associated with other sets, different from the set to which the dimming down command relates, is adapted to increase power from the solar panel in order to maintain the maximum power output from the solar panel.

7. The lighting system as claimed in claim 6, wherein the driver associated with the other sets is adapted to reduce the power from the grid power supply so as to maintain the power to the luminaires of the other sets.

8. The lighting system as claimed in claim 1, wherein the connection unit is adapted:
to connect at least some of the LED lighting units of different luminaires in series to the solar converter; or
to connect at least some of the LED lighting units of different luminaires in parallel to the solar converter.

9. The lighting system as claimed in claim 1, wherein the driver is connected in parallel to the external grid power supply.

10. The lighting system as claimed in claim 1, comprising a respective driver for each luminaire within the set of multiple luminaires or a shared driver for the set of multiple luminaires.

11. The lighting system as claimed in claim 1, comprising a plurality of sets of multiple luminaires, and further comprising an AC-DC power factor correction (PFC) stage, wherein each set of luminaires comprises a DC-DC stage for receiving power from the AC-DC PFC stage, the AC-DC PFC stage and one DC-DC stage together functioning as the associated driver.

12. The lighting system as claimed in claim 1, wherein each LED lighting unit comprises an array of LED chips.

13. A driver unit for driving a luminaire having an LED lighting unit, the driver unit comprising:
a grid input for connection to an external grid power supply; and
a driver connected to the grid input to inject current at a driver output into the LED lighting unit of the luminaire from the grid power supply,
a solar input for connecting the LED lighting unit either to an LED lighting unit of a connected preceding luminaire or to a first power which is derived from a solar panel;
a first output for connecting the LED lighting unit either to an LED lighting unit of a connected following luminaire or to the first power from the solar panel;
wherein the solar input and first output define an interface to another luminaire such that the LED lighting unit is connected to the LED lighting unit of the another luminaire together and share the first power from a solar converter different from the driver, wherein the solar input and the first output are in parallel connection with the driver output to the LED lighting unit, the driver is adapted to drive the LED lighting units simultaneously as the first power.

14. A luminaire comprising:
the LED lighting unit; and
the driver unit as claimed in claim 13.

15. A driving method for an LED luminaire system comprising a set of multiple luminaires, the method comprising:
receiving power from an external grid power supply;
using a driver associated with each luminaire to inject current into an LED lighting unit of the luminaire from the external grid power supply;
receiving energy from a solar panel;
converting the energy from the solar panel into a first power; and
connecting directly connecting a plurality of LED lighting units of the luminaires together to the first power such that the LED lighting units of the set of multiple luminaires share the first power, wherein connecting the driver and the first power in a parallel connection with the LED lighting unit from the perspective of the LED lighting unit, and the driver injecting the current simultaneously as the first power powering the LED lighting unit.

* * * * *